(12) United States Patent
Fallenstein (10) Patent No.: US 6,944,425 B2
(45) Date of Patent: Sep. 13, 2005

(54) METHOD AND APPARATUS FOR PROVIDING WIRELESS DIAGNOSTICS, AUTHENTICATION, AND REDUNDANCY OF WIRED CIRCUITRY

(75) Inventor: Michael John Fallenstein, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 442 days.

(21) Appl. No.: 09/953,802

(22) Filed: Sep. 12, 2001

(65) Prior Publication Data

US 2003/0050010 A1 Mar. 13, 2003

(51) Int. Cl.$^7$ ................................................ H04B 7/00
(52) U.S. Cl. ...................... 455/41.2; 455/41.1; 455/423
(58) Field of Search .................... 455/41, 423, 425, 455/557, 404.1

(56) References Cited

U.S. PATENT DOCUMENTS

| | | | | |
|---|---|---|---|---|
| 5,454,024 A | * | 9/1995 | Lebowitz ..................... | 379/40 |
| 5,684,858 A | * | 11/1997 | Hartmann et al. ............ | 379/40 |
| 6,307,471 B1 | * | 10/2001 | Xydis ....................... | 340/568.1 |
| 6,686,886 B2 | * | 2/2004 | Flint et al. .................. | 343/702 |

FOREIGN PATENT DOCUMENTS

| WO | WO 97/36426 | * 10/1997 | .......... H04N/7/167 |
|---|---|---|---|

* cited by examiner

Primary Examiner—Melur Ramakrishnaiah
(74) Attorney, Agent, or Firm—Moser, Patterson & Sheridan, LLP (57) ABSTRACT

A method and apparatus for providing redundancy, diagnostics, and authentication for hardwired circuit boards in an electronic device. The method and apparatus include a first printed circuit board and at least one second circuit board physically and electrically hardwired to the first printed circuit board. A wireless communications system comprising a first transceiver coupled to the first printed board and at least one second transceiver is respectively coupled to the at least one second printed circuit board. The first transceiver communicates with each of the at least one second transceivers via a respective wireless communications path, such that each wireless communications path runs parallel with at least one hardwired signal path between the first printed circuit board and the at least one second circuit boards.

23 Claims, 4 Drawing Sheets

METHOD AND APPARATUS FOR PROVIDING WIRELESS DIAGNOSTICS, AUTHENTICATION, AND REDUNDANCY OF WIRED CIRCUITRY

FIELD OF THE INVENTION

The invention relates to wireless communications. More specifically, the invention relates to a method and apparatus for providing wireless redundancy, diagnostics, and authentication of electronic circuitry within a hardwired electronic environment.

BACKGROUND OF THE INVENTION

Hard wiring or optical circuitry (e.g., fiber strands) is used to interconnect printed circuit boards (PCBs) in electronic devices such as personal computers, server systems, displays, or any other electronic device that includes multiple PCBs or electronic components. Such PCBs may include network adaptor cards, hard drive controllers, power supplies, modems, or any other electronic circuit that is located on a PCB or other physical medium. Typically, wire leads, PCB traces, cables, connectors, and the like provide the electrical interfaces between such PCBs. For example, many adapter cards are physically and electrically connected to a computer system motherboard by a connector such as a peripheral component interface (PCI) connector, compact PCI (CPCI) connector, and the like.

Despite the usefulness of hardwiring the circuitry of the various components together, the current limitation of only having a physical connection between these circuits is not without flaws. For example, if a catastrophic event occurs to a primary wired/optical path, the catastrophic event could also disrupt a secondary or backup circuit path, since such redundant circuit path is dependant on the same physical type media (e.g., cables, wires, optical strands, and the like).

In addition, many organizations (e.g., manufacturers, licensees, endusers, and the like) desire to implement various levels of security for their electronic systems. One such desirable security level includes the prohibition against installing of unauthorized PCB and/or modular components in an electronic device. However, since the components of the electronic systems are only hardwired and/or optically connected together, such components could easily be added or removed without authorization to perform some unauthorized function not intended by the organization.

Therefore, there is a need in the art for an alternate method and apparatus for providing redundancy, diagnostics, and authentication of the PCBs and modular circuits.

SUMMARY OF THE INVENTION

The disadvantages heretofore associated with the prior art are overcome by the present invention of a method and apparatus for providing redundancy, diagnostics and authentication for hardwired circuit boards in an electronic device. In one embodiment an apparatus includes a first printed circuit board and at least one second circuit board physically and electrically hardwired to the first printed circuit board. A wireless communications system having a first transceiver is coupled to the first printed board, and at least one second transceiver is respectively coupled to the at least one second printed circuit board. The first transceiver communicates with each of the at least one second transceivers via a respective wireless communications path, such that each wireless communications path runs parallel with at least one hardwired signal path between the first printed circuit board and the at least one second circuit boards.

In one embodiment, a method includes detecting a fault along at least one hardwired signal path between the first printed circuit board and the least one second printed circuit board. Diagnostics are performed to identify the fault along at least one hardwired signal path. Once the fault path is identified, the first transceiver and the at least one second transceiver running in parallel with the fault along at least one hardwired signal path are activated, and wireless communications between the first transceiver and the at least one second transceiver running in parallel with the fault along at least one hardwired signal path are enabled to provide a redundant wireless communications path.

In another embodiment, a method of providing authentication via the wireless communications signal path includes positioning the at least one second printed circuit board in communications range of the electronic system, transmitting authentication codes from the at least one second transceiver to the first transceiver, verifying the authentication codes from the at least one second printed circuit board, and sending an acceptance signal where the authentication codes match.

In yet another embodiment, a method includes providing diagnostic information via the wireless communications signal path by positioning the at least one second printed circuit board in communications range of the electronic system, transmitting the diagnostic information from the at least one second transceiver to the first transceiver, checking hardwired signal parameters on the at least one second printed circuit board, and communicating the diagnostic results to an operator.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, wherever possible, to designate identical elements that are common to the figures.

DETAILED DESCRIPTION

Embodiments of the present invention relate to a wireless system for providing electrical connectivity between the internal circuitry of an electronic device. Specifically, the present invention implements a wireless system in addition to the present hardwired circuitry of an electronic device to provide diagnostics, redundancy, and security for various electrical circuits in such electronic device. For purposes of better understanding, aspects of the present invention are illustratively deployed in a computer system, which comprises a plurality of circuits physically located on various printed circuit boards (PCBs), modular devices, and the like. The illustrative PCBs are electrically connected to each other via hardwiring techniques well known in the art. Furthermore, a wireless system is integrated and operates in parallel to multiple hardwired circuits residing on the PCBs and/or system motherboard.

Figure 1:
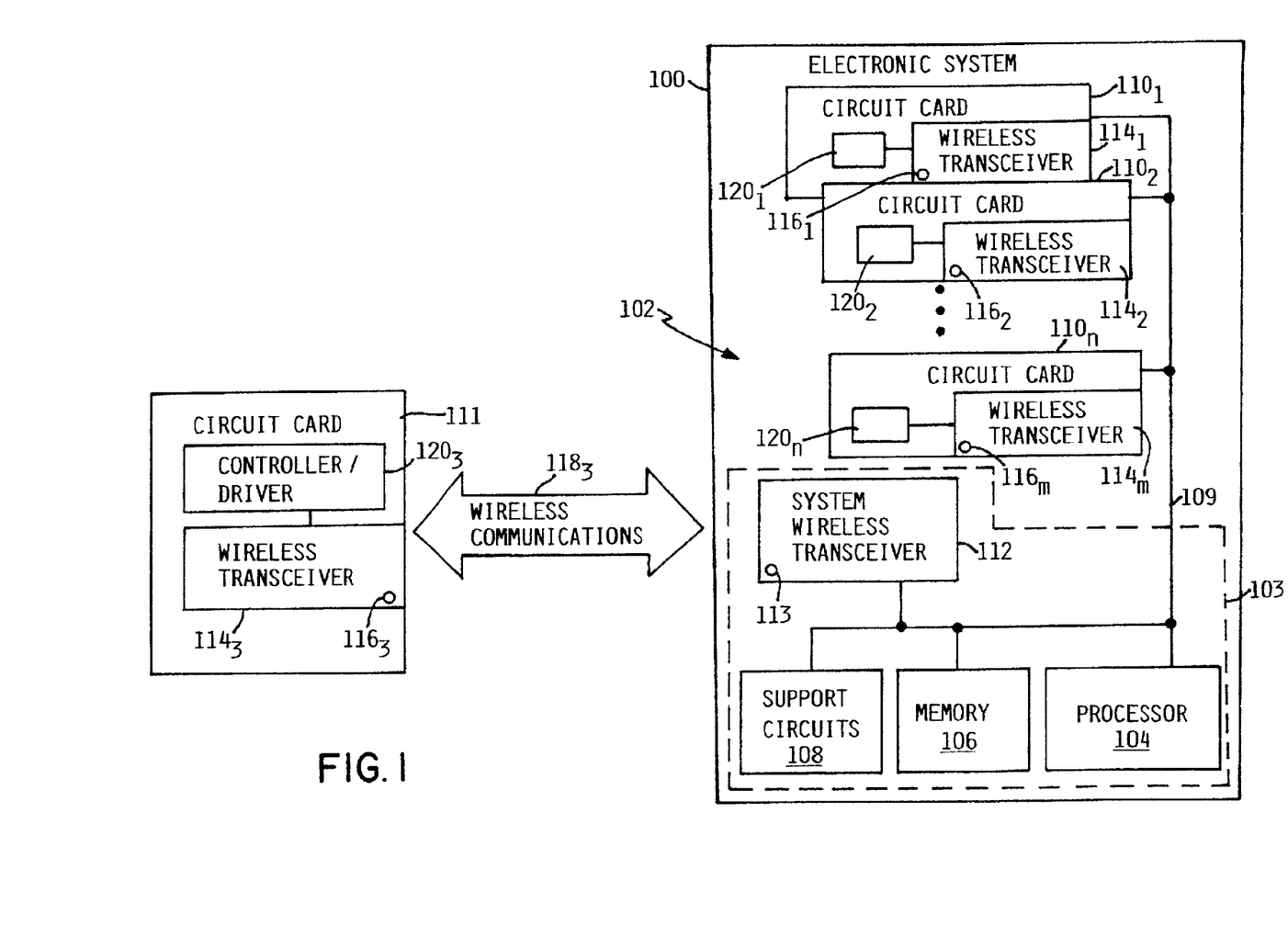
FIG. 1 depicts a block diagram of an electronic device having a wireless communications system between internal circuitry therein.

FIG. 1 depicts a block diagram of an electronic device 100 having a wireless communications system deployed between internal circuitry 102 therein. The electronic device 100 is illustratively depicted as a computer such as a desktop computer system or a server. However, other embodiments may include any electronic device that contains multiple circuits (e.g., PCBs) that provide various functions. For example, the present invention may illustratively be utilized in a television set or other multimedia devices, which illustratively have signal receiving and tuning circuitry, a power supply, and other electronic circuitry.

The illustrative computer system 100 depicted in FIG. 1 comprises at least one system bus 109, to which various components are physically and electrically coupled to communicate with each other. Specifically, processing circuitry 104, memory (e.g., ROM and/or RAM) 106, and other support circuits 108 are coupled to the at least one system bus 109. Typically, the processing circuitry 104, memory 106, other support circuits 108, and the at least one system bus 109 reside on a single system motherboard PCB 103 (drawn in phantom), and are interconnected by various traces within the system motherboard 103. In addition, one or more printed circuit boards (PCBs) $110_1$ through $110_n$ (collectively PCBs 110) such as hard disk controllers, network adaptors, modems, multimedia related circuit cards, and the like may be physically and electrically coupled to the at least one system bus 109.

The processing circuitry 104 receives information from each of the computer components coupled to the system bus 109 and performs system operations based upon the requirements of the computer system's software operating system and application programs (e.g., a Web browser) that are illustratively stored in permanent storage medium such as one or more disk drives (not shown). The system bus 109 may comprise one or more data buses. The processing circuitry 104 may include one or more PENTIUM® type processors by Intel Corp., a Power PC® from IBM, or the like. The memory 106 typically includes read-only memory (ROM) having a Basic Input-Output System (BIOS) program, which controls basic hardware operations such as the interaction of the processing circuitry 104 with a keyboard/mouse, hard drive, or video display (not shown), and the other devices. The memory 106 also includes random-access memory (RAM), which is volatile memory that loads the operating system and applications software as required, from the permanent storage medium such as a hard drive or a CD-ROM player (not shown) where such software programs are permanently stored. Typically, the other support circuits 108 include clocks, I/O controllers for input and output devices, bus circuitry, and the like (not shown).

In addition, the PCBs 110 may also contain similar circuitry 120 as described in the computer system 100 above. In particular, each PCB 110 may illustratively include in its circuitry 120 additional controllers, memory, a processor, and other support circuits that are particular to the function of the individual printed circuit board. For example, a disk drive controller may contain a processor, memory, and other support circuits on a single PCB for controlling an array of disk drives.

The fore mentioned components coupled to the at least one system bus 109 are physically and electrically connected thereon by various physical mediums commonly known as "hardwiring". For example, a PCB 110 such as a network adapter or graphics card may physically plug into a connector, which is known in the art as an "expansion slot" (not shown). One type of expansion slot in a computer system developed by the computer manufacturers such as Intel, IBM, and others in the computer industry is a peripheral component interconnect (PCI) slot, which connects to a PCI local bus. The PCBs 110, which conform to the PCI de facto standard, have a plurality of contacts (not shown) that mate with contacts in the expansion slot, to provide a physical and electrical connection to the one or more system buses 109. As such, the speed and bit rate for transferring data between two circuit boards 110 or the processing circuitry 104 is dependent upon the bus architecture. For example, the current PCI-X bus architecture handles 64 bit data at a maximum bus frequency of 133 MHz and can transfer up to 1 gigabyte (GB) of data per second.

The electronic system 100 also comprises the wireless communications system having at least two transceivers. As defined herein, a wireless communications system is any system configured to support wireless communications between a first wireless device and a second wireless device. As a particular illustration, at least one system wireless transceiver 112 (i.e., first wireless device) is coupled via the at least one system bus 109 to the processing circuitry 104. Furthermore, at least one wireless transceiver (e.g., $114_1$ through $114_m$, collectively wireless transceivers 114,) i.e., the second wireless device)) is respectively coupled to at least one PCB 110. The wireless communications system may operate when the PCB's 110 are physically installed to the system bus 109 of the electronic system 100 or, detached from the electronic system 100. For example, a PCB 111 is not physically installed in the electronic system 100, however, PCB 111 is in wireless communication with the electronic system 100 via wireless communications path $118_3$ as discussed further below.

The wireless communications system may operate under any wireless standard, such as "Bluetooth," IEEE 802.11 (i.e., 802.11a, 802.11b (hereinafter "802.11" standards)), Open Air Industry standards, Home RF Working Group's Shared Wireless Access Protocol (SWAP), any of the HiperLAN family standards (e.g., HiperLAN/2, Hiper Access, HiperLink), and the like, which are hereby incorporated by reference herein. In particular, both the Bluetooth and the 802.11 standards illustratively provide for wireless technology that supports both point-to-point and point-to-multipoint connections. The wireless transceivers 114 and the system transceiver 112 communicate with each other using, illustratively, radio frequency (RF) signals along wireless communications paths (e.g., communication path $118_3$). For example, under the Bluetooth de facto standard, up to seven "slave" devices can be set to communicate with a "master" radio in one device. As such, a single wireless transceiver (e.g., the system transceiver 112) may communicate with multiple PCBs 110 having wireless transceivers 114 under any of the wireless communications standards.

Figure 2:
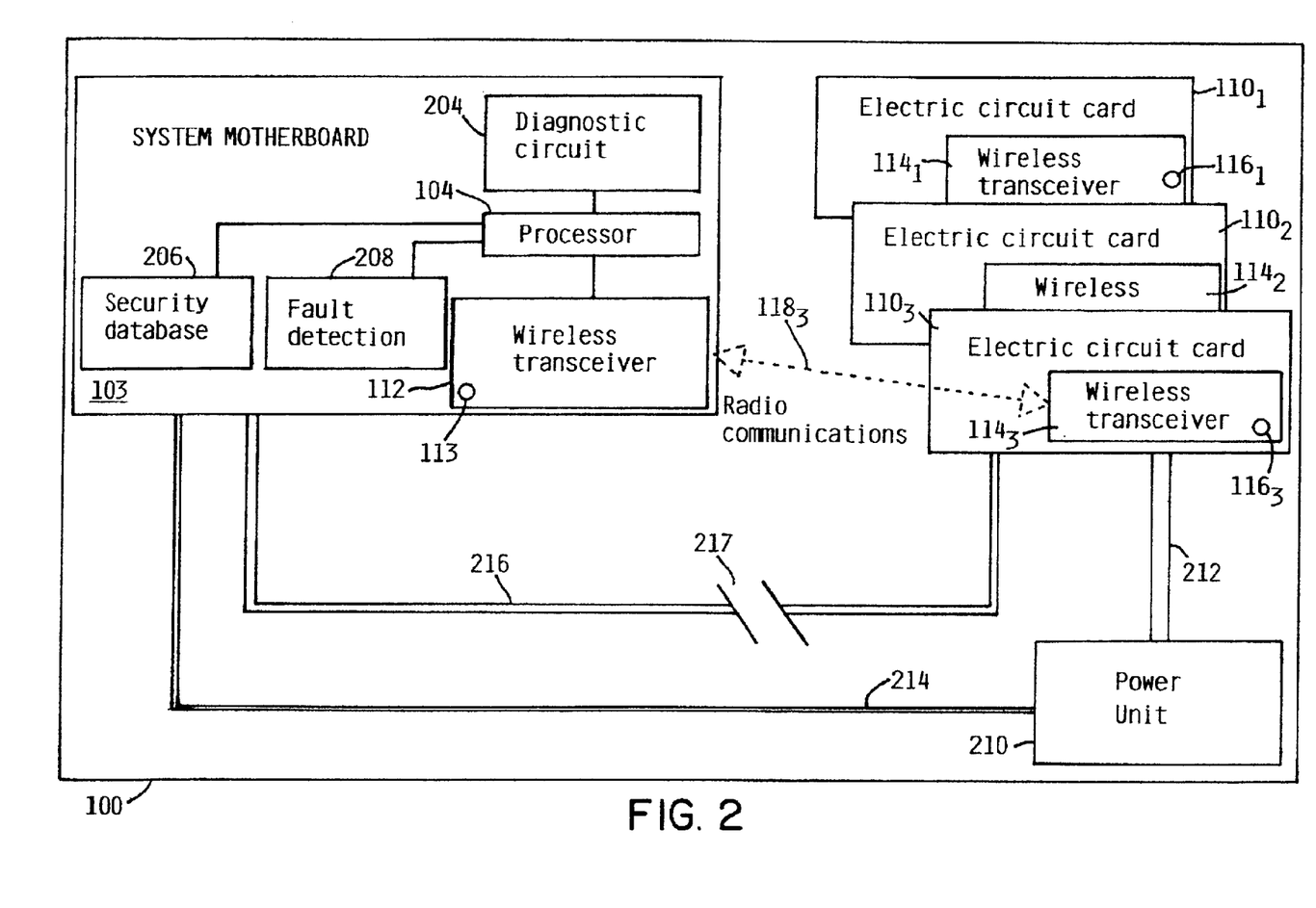
FIG. 2 depicts a block diagram of the electronic device of FIG. 1 illustrating wireless diagnostic and redundant communication paths of the present invention.

FIG. 2 depicts a block diagram of the electronic device of FIG. 1 illustrating wireless diagnostic and redundant communication paths. The RF transceivers 112 and 114 used in the present invention may be commercially available transceivers, such as the model "ROK101007" transceiver, manufactured by Ericsson Corporation. Where utilized, each transceiver 114 is physically connected (e.g., wire soldered, plug-in, and the like) to the PCB 110. In one embodiment, power is provided to the transceiver 114 via hardwiring directly from the PCB 110 via a hardwired power line 212 from a power supply 210. Alternately, the power may be provided to its respective PCB 110 by the power source 210 via the motherboard 103, to which the PCB 110 is physically and electrically connected. Similarly, the system transceiver 112 is physically attached to the motherboard 103. Power is provided to the system transceiver 112 via hardwiring 214 through the motherboard 103, which receives power from the power source 210 of the electronic system 100.

Additionally, each of the transceivers 114 and 112 may be coupled to a battery (e.g., batteries $116_1$ through $116_m$ (collectively batteries 116) and a system transceiver battery 113). Typically, the batteries 116 and 113 have a voltage in the range of 1 to 12 volts. In one embodiment, the batteries 116 and 113 are respectively coupled to the transceivers 114 and 112 to provide a redundant source of power to the transceivers in the event the hardwired power path to the transceiver fails. In particular, the battery 114 and 112 is used as a back-up power source for the transceiver in the event the hardwired power line between the PCB 110 and the transceiver 114 fails. In another embodiment, the batteries 114 and 113 installed in the transceivers may also power the PCB 110 in the event of a hardwire power failure. As such, the batteries 113 and 116 have a voltage in the range of 1 to 12 volts, which enables the PCB to operate for some period of time based on the PCB usage, until the failure can be corrected.

The wireless communications path 118 provides alternate communications signal paths that are in parallel with the hard-wired communications paths (e.g., buses 109, cables, connectors, and the like), which are between the various PCBs 110. The electronics system 100 further comprises fault detection circuitry 208 to identify critical hardwire failures that will interrupt system level or PCB level operations. The fault detection circuitry 208 allows the system motherboard 103 to monitor designated hardwired signal paths for signal interruptions (e.g., open and short circuits, and intermittent interruptions) between the PCBs 110. Specifically, the fault detection circuitry 208 may illustratively provide the checking of signal timing, voltage, error signals, or no signal at all. Once the fault detection circuitry 208 identifies an interrupted hardwired communications path, the processing circuitry 104 on the motherboard 103 enables (i.e., activates) the corresponding system transceiver 112 and PCB transceiver 114. Thereafter, the system transceiver 112 and PCB transceivers may continue to communicate the same type of hardwired signals, using the wireless communications path 118. Preferably, the processing circuitry 104 notifies an administrative operator of the hardware failure and/or the activation of the wireless transceivers 112 and 114. In this manner, steps may be taken to retransmit information that was unsuccessfully transmitted via the now faulty hardwired path. Furthermore, one skilled in the art will recognize that the wireless communications path 118 may be between peer PCBs (e.g., PCB $110_1$ and PCB $110_2$), which operate in conjunction. As such, the fault detection circuitry 208 identifies an interrupted communications path between the peer PCBs $110_1$ and $110_2$.

Figure 3:
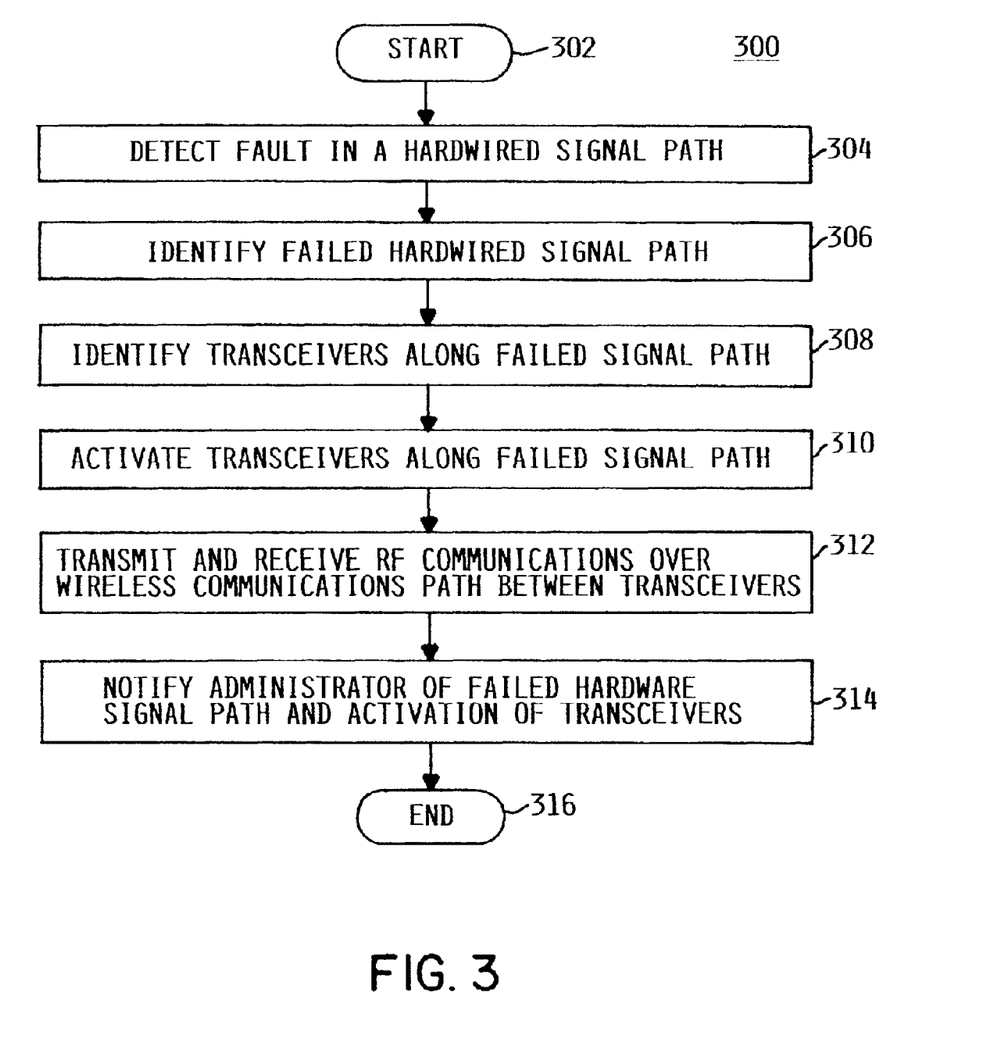
FIG. 3 depicts a flow chart of a method of providing redundancy using the wireless communications system for the electronic device of FIGS. 1 and 2.

FIG. 3 depicts a flow chart of a method 300 of providing redundancy using the wireless communications system for the electronic device 100 of FIGS. 1 and 2. FIG. 3 should be viewed in conjunction with FIG. 2. The method 300 begins in step 302 where the electronic device 100 is operating using the hardwired circuit paths between the PCBs 110 and the motherboard 103. In step 304, the fault detection circuitry 208 detects an interruption along one of the designated paths having a redundant wireless communications system installed thereon. In step 306, the fault detection circuitry 208 communicates the identified failed hardwired signal path (e.g., fault 217 on hardwired signal path 216) to the processing circuitry 104.

In step 308, the processing circuitry 104 further identifies at least two transceivers (e.g., 114 and 112), which are capable of providing a redundant path for the failed hardwired signal path. Illustratively, the method 300 identifies the system transceiver 112 and PCB transceiver $114_3$ as the two transceivers that provide a redundant wireless signal path for the failed hardwired signal path 216. Specifically, in one embodiment, the processing circuitry 104 accesses a mapping table (not shown) stored in memory 106, which correlates (i.e., maps) the PCB transceivers 114 and various diagnostic signals of the PCB's 110 with their respective PCB 110. The mapping table is illustratively created and then stored in the RAM during each boot-up so as to provide current information each time the electronic system 100 is turned on. Alternately, the table may reside in permanent memory and is updated periodically by a diagnostic circuit 204. As such, when the fault detection circuitry 208 detects a hardwired signal path fault, for example, fault 217 between the motherboard 103 and the PCB $114_3$, the processing circuitry 104 accesses the mapping table to identify the proper transceiver to activate and provide a redundant wireless signal path for the failed hardwired signal path (e.g., signal path 216).

In step 310, the processing circuitry 104 activates the system transceiver 112 and PCB transceiver $114_3$. In one embodiment, the transceivers 112 and 114 remain in a stand-by mode until activated to a communications mode. An activation signal may be sent along hardwired paths (e.g., dedicated hardwired paths) to each of the transceivers 112 and $114_3$. In an alternate embodiment, the transceiver 112 activates the PCB transceiver 114, which in a stand-by mode, via a wireless communication signal. In yet another embodiment, both the transceivers 112 and 114 are always set in the communications mode but do not communicate until instructed to do so by the processing circuitry 104. In any case, the transmitting and receiving capabilities of the transceivers 112 and 114 are enabled. The method 300 then proceeds to step 312. In step 312, the transceivers 112 and $114_3$ communicate wireless RF signals therebetween, thereby providing an alternate signal path between circuits. In step 314, the processor circuitry 104 optionally notifies an administrative operator of the hardware failure and/or that the transceivers are enabled, and in step 316, the method 300 ends.

Thus, the wireless communications system will operate to provide an alternate signal path in the event of a hardwire signal path failure. Furthermore, the wireless communications system will operate as long as power is provided to the transceivers 112 and 114. Where a hardwire failure occurs on the power line to the transceiver, the batteries 113 or 116 temporarily enable the transceivers 112 and 114 for as long as the batteries last or until the hardwired power line is repaired.

Additionally, the wireless communications system is capable of providing PCB diagnostics. In particular, diagnostic hardware and software (hereinafter "diagnostic circuitry" 204) is installed individually or on both the system motherboard 103 and PCB's 110. The diagnostic circuitry 204 (illustratively shown only on the motherboard 103 of FIG. 2) is specifically designed to perform diagnostics for each type of PCB 110. That is, the diagnostic circuitry 204 provides specific information regarding a specific PCB 110 to the processing circuitry 104 of the electronic system 100. In particular, the diagnostic information from the diagnostic circuitry 204 is communicated between via the transceivers 114 and 112 of the respective PCBs 110 and system motherboard 103 to the processing circuitry 104.

In one embodiment, the processing circuitry 104 provides the diagnostic information to an administrative operator for analysis, troubleshooting, and repair. In another embodiment, the processing circuitry 104 may instruct or download information to the failing PCB to remedy the problem. For example, referring to FIG. 2, if the PCB $110_3$ is diagnosed with a hardwire failure as between itself and the system motherboard 103, the system transceiver 112 and PCB transceiver $114_3$ are enabled, as discussed above. Furthermore, the diagnostic circuitry 204 (illustratively located on the motherboard 103) performs diagnostics (i.e., tests various lines, registers, and other components and software) on the PCB $110_3$ to identify the problem. If the problem can be resolved by additional software and/or rerouting of one or more signal paths, then the processing circuitry 104 may provide such solution by sending the required information to the PCB $110_3$ via the transceivers 112 and $114_3$.

Moreover, the diagnostic circuitry 204, in conjunction with the wireless communications system may be utilized prior to installing a PCB 110 into the electronic system 100. That is, the wireless communications system is capable of running circuit diagnostics without having to physically attach the PCB 110 to the system bus 109. Recall that the battery 116 attached thereon alternately powers the transceiver 114 on the PCB 110. As such, diagnostics of the PCB 110 may be communicated between the PCB 110 and processing circuitry 104 on the motherboard 103, via the self-powered transceiver 114 on the subject PCB 110 and the system transceiver 112 on the motherboard 103. A person skilled in the art will understand that the battery 116 on the PCB will provide the power to perform such diagnostics on the PCB 110, despite the fact that the PCB 110 itself is not physically and electrically coupled to the at least one bus 109 in the electronic system 100.

The wireless communications system is also capable of providing authentication of electronic circuits (i.e., PCBs 110) prior to activation. The authentication capability provides security by having, for example, the PCB 110 authenticate itself wirelessly to the processing circuitry 104 on the system motherboard 103. In particular, authentication signals (i.e., coded bits or bytes) are sent from the PCB transceiver 114 to the system transceiver 112 on the motherboard 103. The authentication signals received by the system transceiver 112 are sent to the processor circuitry 104 for comparison to current authentication codes stored in a security database 206 (e.g., EEPROM, flash memory, and the like), which is illustratively coupled to the motherboard 103. The security database 206 stores authentication codes for the various PCBs 110, and may be updated from time to time, as required.

Figure 4:
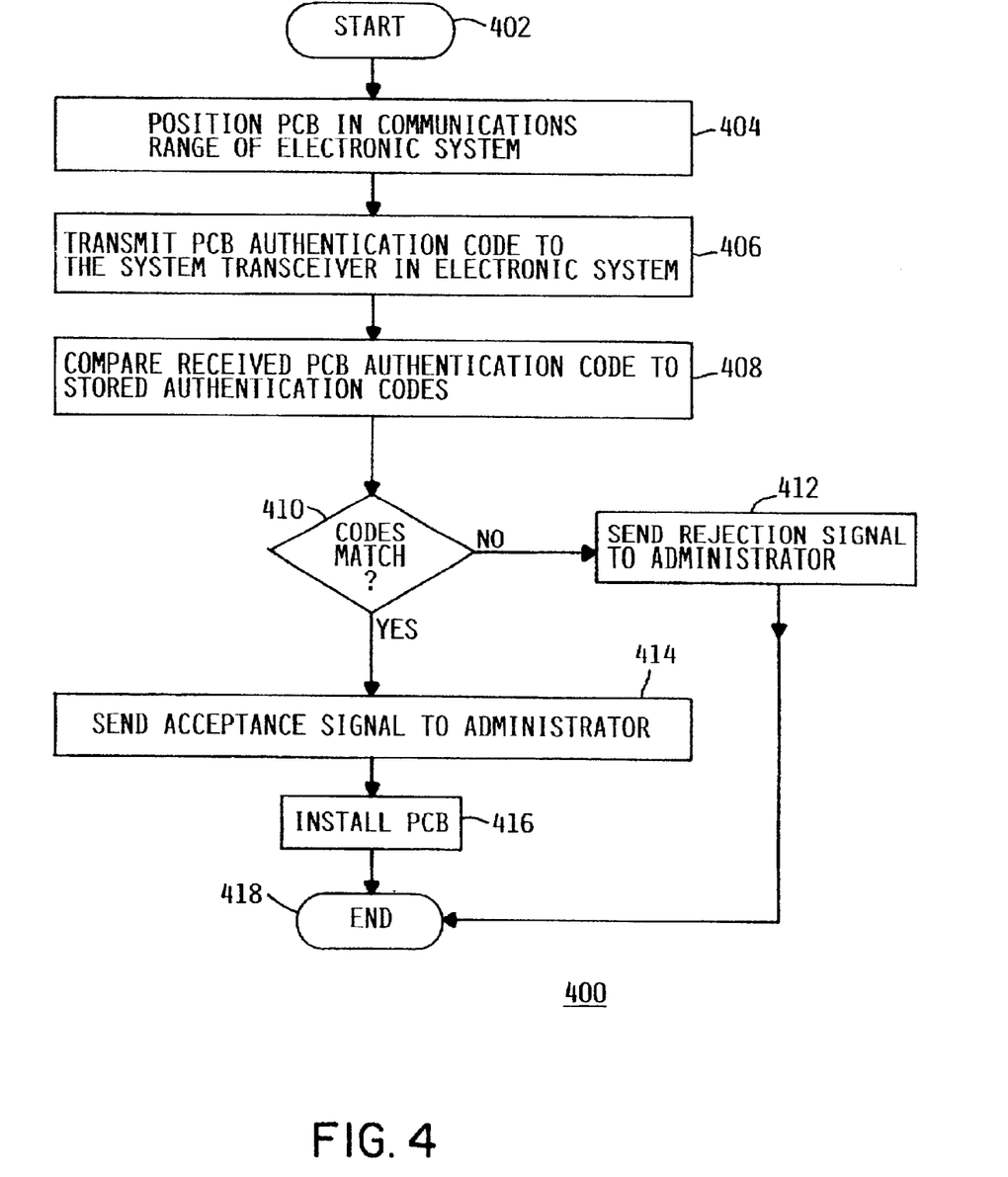
FIG. 4 depicts a flowchart of a method of authenticating a PCB prior to installation in the electronic system of FIGS. 1 and 2.

FIG. 4 depicts a flowchart of a method 400 of authenticating a PCB 110 prior to installation in the electronic system 100 of FIGS. 1 and 2. The method 400 starts in step 402 and proceeds to step 404, where the PCB 110 having the transceiver 114 is positioned in communication range of the system transceiver 112. Typically, the communication range is approximately 0.1 to 100 feet, which allows the transceivers 114 and 112 to communicate with minimal interference. In step 406, the transceiver 114 coupled to the subject PCB 110 transmits an authentication code (e.g., bits or bytes of information) to the transceiver 112, which is coupled to the motherboard 103 in the electronic system 100. As discussed above, the battery 116 provides enough power to the PCB 110 to permit diagnostics, as well as accessing a memory device (not shown) such as a PROM coupled to the PCB 110. The memory device on the PCB 110 stores a particular authentication code, which represents specific information, such as PCB manufacturer, PCB model, PCB serial number, manufacturing date, embedded program code version, date of latest program code update, and the like. In addition, the authentication code may provide licensing information such as the authorized time period of use, countries, and the like. In step 408, the system transceiver 112 receives the authentication code from the PCB transceiver 114 and routs such information to the processing circuitry 104. The processing circuitry 104 accesses a memory device 206 containing security information, such as a listing of authorized authorization codes, and the method 400 proceeds to step 410.

In step 410, a query is made to determine whether the received authentication matches the proper authentication codes illustratively stored in the memory device 206 on the motherboard 103. In a second embodiment, the authorization code may be stored on a server having Internet access, such that a PCB 110 may be authenticated by communicating via the transceiver 114 with such server without having to be installed in the server or computer system 100.

If, in step 410, the query is answered negatively, then the method 400 proceeds to step 412, where a non-authorization signal is sent back to the administrative operator. Specifically, the processing circuitry 104 initiates a signal via the wireless communications system, which ultimately indicates that the PCB 110 should not be installed into the electronic system 100. In one embodiment, in the event the authentication codes in step 410 do not match, the electronic system may include circuitry (not shown) to prevent the unauthorized board from operating, when installed despite the warning that the PCB 110 is not authorized. Such added circuitry provides additional security to the electronic system 100.

Alternatively, if in step 410, the query is answered positively, then the method 400 proceeds to step 414. In step 414, an authorization signal is sent back to the administrative operator, which signifies that the PCB 110 may be installed. Specifically, the processing circuitry 104 initiates a signal via the wireless communications system, which ultimately indicates the PCB 110 may be installed into the electronic system 100. One skilled in the art will recognize that the authorization and non-authorization signals may be communicated to a person such as an administrative operator, technician, installer, and the like by light, sound, or any other communications medium that can be interpreted by a person. For example, the PCB 110 could signal authorization by the act of unlocking a device such as a server or computer system 100. The method 400 then proceeds to step 416, where the PCB 110 is initialized (e.g., installed) into the electronic system 100, and in step 418, the method 400 ends.

For purposes of illustration, the wireless communications has been discussed in terms of radio frequency (RF), however, one skilled in the art will recognize that the RF signals should not be considered as limiting. Furthermore, the present embodiments discuss the system transceiver 112 as a single transceiver positioned on the motherboard 102. However one skilled in the art will recognize that additional transceivers 112 may be coupled to the motherboard 103 and provide the wireless communications to the PCB's 110. Although several preferred embodiments that incorporate the teachings of the present invention have been shown and described in detail, those skilled in the art can readily devise many other varied embodiments that still incorporate these teachings.

What is claimed is:

1. An electronic system, comprising:
   a mother printed circuit board;
   at least one peripheral printed circuit board physically and electrically hardwired to the mother printed circuit board by a hardwired connection defined a system bus, the system bus also connected to a processor; and
   a wireless communications system comprising a first wireless communications device coupled to the mother printed circuit board and at least one second wireless communications device coupled to the at least one peripheral printed circuit board, where the first wireless communications device and the at least one second wireless communications device are coupled for wireless communication with one another via a wireless connection.

2. The electronic system of claim 1 wherein the wireless connection is selectively enabled as an alternate connection to the hardwired connection between the mother printed circuit board and the peripheral printed circuit board.

3. The electronic system of claim 1 wherein the first wireless communications device end the at least one second wireless communications device are powered by batteries.

4. The electronic system of claim 1 wherein the wireless communications system operates under a wireless standard selected from the group comprising Bluetooth, IEEE 802.11 family standards, Open Air industry standards, Shared Wireless Access Protocol (SWAP), and HiperLAN family standards.

5. The electronic system of claim 1 further comprising at least one fault detection circuit respectively coupled to the mother printed circuit board and the at least one peripheral printed circuit board, wherein the wireless communications system is enabled upon the at least one fault detection circuit detecting a hardwired signal path failure between the mother printed circuit board and the at least one peripheral printed circuit board.

6. The electronic system of claim 4 further comprising: diagnostic circuitry coupled to the mother printed circuit board end the at least one peripheral printed circuit board, wherein the wireless communications system provides diagnostic information regarding specific hardwired signal paths from at least one peripheral printed circuit board to the mother printed circuit board.

7. The electronic system of claim 6 wherein the diagnostic circuitry performs diagnostics to identify a failed hardwired signal path detected by the fault detection circuitry via the wireless communications system.

8. The electronic system of claim 7 wherein the diagnostic circuitry provides instructions to circumvent a failed hardwired signal path via the wireless communications system.

9. The electronic system of claim 6 wherein the diagnostic circuitry performs diagnostics of the at least one peripheral printed circuit board via the wireless communications system, prior to forming the hardwired signal path to the mother printed circuit board.

10. The electronic system of claim 4 further comprising authentication circuitry coupled to the mother printed circuit board an the at least one peripheral printed circuit board, wherein the wireless communications system provides authentication information regarding the at least one peripheral printed circuit board to the mother printed circuit board.

11. The electronic system of claim 10 wherein the authentication circuitry further comprises a security database containing authorization codes for the at least one peripheral printed circuit board.

12. A method of providing a redundant wireless communications signal path in an electronic system comprising a first printed circuit board, at least one second printed circuit board hardwired to the first printed circuit board via a system bus, and a wireless communications system having a first wireless communications device coupled to the first printed circuit board and at last one second wireless communications device coupled to the least one second print circuit board, the method comprising:
   detecting a fault along at least one hardwired signal path between the first printed circuit board and the least one second printed circuit board; and
   establishing a wireless communications path between the first wireless communications device and the at least one wireless communications device, whereby the wireless communications path is an alternative communications path for the at least one hardwired signal path.

13. The method of claim 12 further comprising providing notification of the fault along at least one hardwired signal path.

14. The method of claim 12 wherein prior to the detecting step, the method further comprises:
   transmitting authentication codes from the at least one second transceiver to the first transceiver;
   verifying the authentication codes from the at least one second printed circuit board; and
   sending an acceptance signal where the authentication codes match.

15. The method of claim 14 wherein prior to the transmitting step, the method further comprises positioning the at least one second printed circuit board in communications range of the electronic system.

16. The method of claim 14 wherein the verifying step further comprises:
   sending the authentication codes from the at least one second printed circuit board to processing circuitry on the first printed circuit board; and
   matching the authentication codes from the at least one second printed circuit board with a plurality of authentication codes stored in memory on the first printed circuit board.

17. The method of claim 16 wherein after sending the acceptance signal, the method further comprises hardwire coupling the at least one second printed circuit board to the first printed circuit board.

18. The method of claim 14 wherein the authentication codes provide identification of the at least one second printed circuit board representing authorizations selected from the group comprising PCB manufacturer, PCB model, PC serial number, manufacturing date, embedded program code version, date of latest program code update, licensing information, authorized time period for use, and authorized countries.

19. The method of claim 12 further comprising:
   transmitting the diagnostic information from the at least one second transceiver to the first transceiver;
   checking hardwired signal parameters on the at least one second printed circuit board; and
   communicating diagnostic results to an operator.

20. The method of claim 19 wherein the checking step further comprises checking, signal timing, voltages, error signals, and absence of signal.

21. The method of claim 20 further comprising the steps of:
   providing instructions to circumvent a detected hardwired fault in the at least one second printed circuit board via the first and second transceivers; and
   communicating a second diagnostic result to an operator.

22. The method of claim 20 further comprising initializing the at least one second printed circuit board upon receiving a satisfactory diagnostic report.

23. A method of providing a redundant wireless communications signal path in an electronic system comprising a first printed circuit board, at least one second printed circuit board hardwired to the first printed circuit board, and a wireless communications system having a first wireless communications device coupled to the first printed circuit board and at least one second wireless communications device coupled to the least one second printed circuit board, the method comprising:

transmitting authentication codes from the at least one second transceiver to the first transceiver, wherein the authentication codes provide identification of the at least one second printed circuit board;

verifying the authentication codes from the at least one second printed circuit board;

sending an acceptance signal where the authentication codes match;

detecting a fault along at least one hardwired signal path between the first printed circuit board and the least one second printed circuit board; and     establishing a wireless communications path between the first wireless communications device and the at least one wireless communications device, whereby the wireless communications path is an alternative communications path for the at least one hardwired signal path.

* * * * *